No. 828,084. PATENTED AUG. 7, 1906.
E. BOUTEILLÉ.
GLAZING OF HORTICULTURAL AND OTHER STRUCTURES.
APPLICATION FILED FEB. 5, 1904.

2 SHEETS—SHEET 1.

Witnesses:

Inventor:
Etienne Bouteillé
by Henry Connett
Attorney

No. 828,084. PATENTED AUG. 7, 1906.
E. BOUTEILLÉ.
GLAZING OF HORTICULTURAL AND OTHER STRUCTURES.
APPLICATION FILED FEB. 5, 1904.

2 SHEETS—SHEET 2.

Witnesses:
J. W. Zimau
William J. Firth

Inventor:
Etienne Bouteillé
by Henry Connett
Attorney

THE NORRIS PETERS CO., WASHINGTON, D. C.

UNITED STATES PATENT OFFICE.

ETIENNE BOUTEILLÉ, OF PARIS, FRANCE.

GLAZING OF HORTICULTURAL AND OTHER STRUCTURES.

No. 828,084.     Specification of Letters Patent.     Patented Aug. 7, 1906.

Application filed February 5, 1904. Serial No. 192,139.

*To all whom it may concern:*

Be it known that I, ETIENNE BOUTEILLÉ, a citizen of the Republic of France, residing at Paris, France, have invented new and useful Improvements Relating to the Glazing of Horticultural and other Structures, of which the following is a specification.

This invention relates to means for fixing glass in frames designed to receive them under conditions which insure perfect tightness between the edges of the glass and the frames which carry them, notwithstanding the weather, changes of temperature, and the consequent effects of expansion and contraction. This result is obtained by the use of the impervious flexible strip which forms the subject of my French patent of February 27, 1903, No. 329,777, and which firmly adheres to glass, iron and wood and in general to any material employed in building. This impervious flexible strip thus serves as a means of connection between the panes of glass and the contiguous surfaces which are designed to support them or to which they are to be united. Moreover, this impervious strip, which adapts itself to various shapes, can even serve as a conduit for water of condensation resulting from the interior vapor which is deposited upon the panes of glass. The applications of this system of glazing are very numerous, and the accompanying drawings illustrates a number of examples of glazing which can be advantageously effected under the conditions which have just been set forth.

Figure 1:
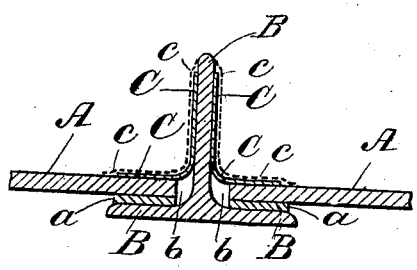
Figure 3:
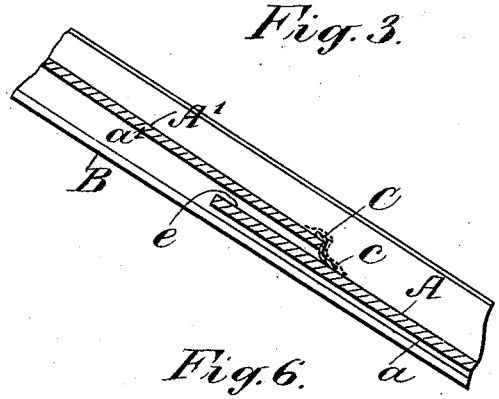
Figure 2:
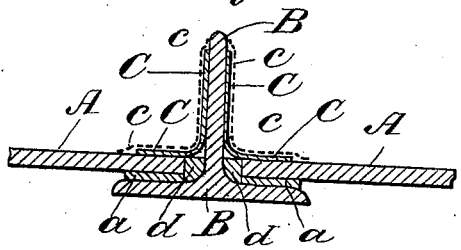
Figure 6:
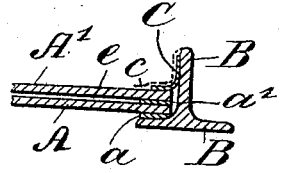
Figure 9:
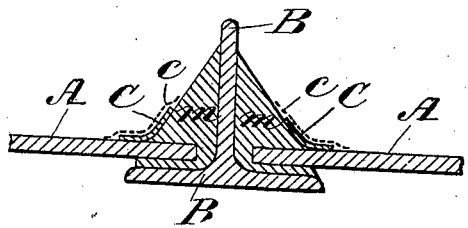
Figure 7:
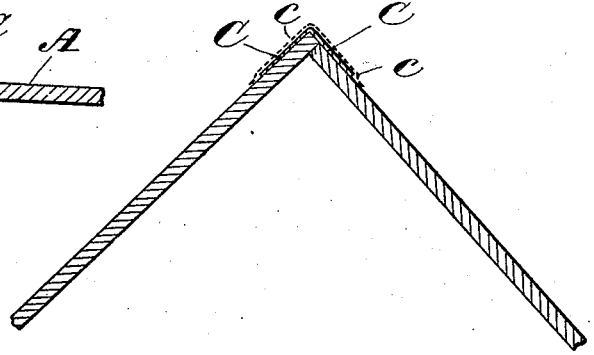
Figure 4:
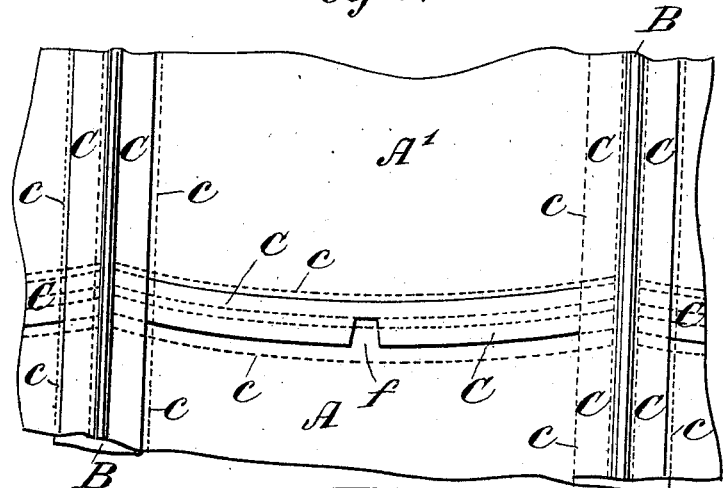
Figure 5:
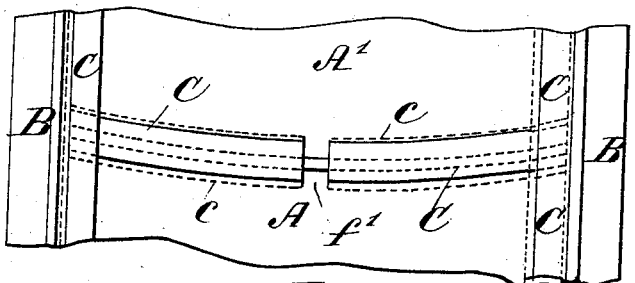
Figure 8:
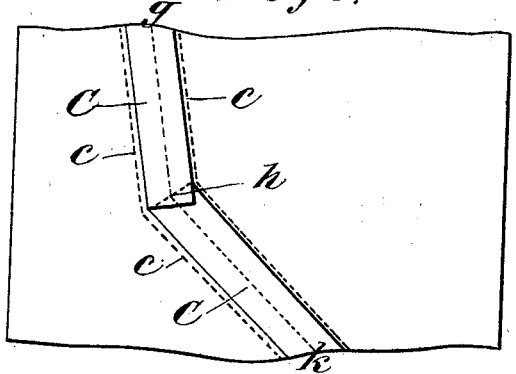

In the drawings, Figure 1 is a transverse section of the glass and frame, and Fig. 2 is a similar view illustrating a slightly-different arrangement of the putty. Figs. 3, 4, 5, and 6 illustrate an advantageous application of the invention which will be hereinafter described. In these views Fig. 3 is a longitudinal section; Fig. 4, a front elevation; Fig. 5, a slightly-modified form of the construction seen in Fig. 4, and Fig. 6 is a transverse section of the joint seen in Fig. 3. Fig. 7 is a section showing how the invention may be applied to a joint where two panes of glass abut at an angle. Fig. 8 shows how a crack in the broken pane may be repaired, and Fig. 9 is a cross-section showing how the invention may be applied to an old puttied joint.

In the figures, A designates generally the glass; B, the T-iron bar; C, the flexible impervious strip; *a*, the putty; *b*, the edge of the glass supported on the bar, and *c* a coat of paint applied over the strip C. The glass can be placed directly in the rabbet of the T-iron bar without the intervention of a thickness of putty. Still it is preferable to place a small layer of putty *a* between the glass A and the iron B. In order that the putty shall not ultimately form an obstacle to the free lateral expansion of the glass in its frame, it is advantageous that the putty should not extend beyond the edge *b* of the glass, and this result is obtained by passing a knife against this edge of the glass and removing the small quantity of putty thus detached. Then the glass is fixed to the iron, and for this purpose I employ the impervious flexible strip obtained in the following manner: This strip is a band of linen, cotton, or the like which is prepared by steeping it in a fatty non-drying substance mixed, if required, with a white or colored powder, Spanish white, ochers, &c. A composition which gives good results is obtained by mixing three-fourths parts of vaseline-oil with one-fourth part of vaseline. The bands are left to soak in this mixture for about two days in order that it may thoroughly penetrate the fabric to render it quite impervious. The bands thus prepared remain in this state as long as may be required, and they are sold as they are to the glazing contractors. They are ready for use. To apply one of these bands or strips, it is covered on one side with white lead or zinc-white.

When, as shown in Fig. 1, it is required to fix a pane of glass in an iron frame, (the operation would be the same if the frame were of wood,) the strip C is placed so that nearly half its width is applied over the glass and the other part of the strip, turned up at a right angle, is applied against the web of the T-bar. The whole length of the elastic strip is advantageously applied over the glass and against the iron, so that a neat appearance shall be presented throughout. To finish the work, a coat of paint (indicated in Fig. 1 by the letter *c* and shown in dotted lines) is laid on the applied strip. Care must be taken to extend the paint slightly beyond the edges of the elastic strip (two to three millimeters, for example) in order that the paint covering the strip of fabric shall form a continuous surface between this top part, the edge of the strip, and the glass. As the paint dries it hardens the edge of the strip, it absolutely prevents any tendency to come off, and it renders the whole rain-proof. In this manner the flexible strip will always with certainty remain in proper position, and consequently the glass will remain securely connected to its frame without recourse to putty employed in the ordinary manner and which is acknowledged to be objectionable because it cracks and breaks, and a considerable length often becomes detached, allowing wind and water to penetrate. It will be understood that owing to this impervious flexible strip C thus utilized to connect the glass to the frame the glass has considerable freedom of movement in its framing, the flexible or supple strip yielding to the slight movements of expansion and contraction of the glass, as well as to the vibrations to which glazed structures are often subjected.

When it is desired that the space left, as hereinbefore explained, between the web of the T-bar or the side of the frame and the edge $b$ of the glass shall not remain empty, it can, as shown in Fig. 2, be filled with putty $d$, but this latter should be soft. A composition which gives good results is a putty composed of powdered cork and glue.

Figs. 3, 4, 5, and 6 illustrate how this strip may be used to meet all the conditions required for glazing structures in which the panes of glass overlap, with spaces for the discharge of condensation. The lower pane A rests, as already stated, upon the head of the bar B, a thin layer of putty $a$ being interposed. The upper pane A' also rests upon the head of the bar with putty $a'$ interposed, this layer of putty being thicker than the layer $a$ and there being a certain space at $e$ between the two panes at the part where they overlap. In order that in a hurricane wind and rain shall not penetrate from the outside through this space $e$, I use my flexible strip to cover the front of the upper pane A'. This strip C is applied over the lower edge of the pane A', so that it closes the front of the space $e$, and over the lower pane A. This application of the impervious flexible strip is very easily carried out under the conditions which have been already explained by means of a coating of white lead or zinc-white a layer of paint being similarly spread over the top and slightly extending—say, for one or two millimeters—beyond the applied flexible strip. Naturally the panes are secured on the sides by means of a strip C, placed anglewise, as hereinbefore explained, with reference to Figs. 1 and 2.

As the strip C is impervious, it can be utilized in certain cases to form a conduit or gutter in which the condensed vapor can accumulate. The said vapor rising in the glazed structure—such as a hall, a greenhouse, a winter-garden, or the like—becomes deposited upon the lower surface of the panes and runs down into the space $e$. It is caught by the impervious flexible strip which covers the front of the upper pane and runs out through a hole made at the lower part at $f$. (See Fig. 4.)

The outlet-hole for the condensation can be obtained by leaving a certain space $f'$ (see Fig. 5) between the two pieces of flexible strip C, which are applied to the front of the pane A'. This impervious flexible strip can also be used in many cases—for example, as shown, Fig. 7—to unite two panes which abut angularly. It can also be utilized for effecting repairs. Thus, as shown in Fig. 8, a crack in a broken pane can be stopped by applying over the line of rupture $g\ h\ k$ a flexible strip C, fixed by means of a coating, as already explained, and on which the paint is applied, extending slightly beyond the edge. Fig. 9 shows the impervious flexible strip utilized for strengthening a covering already made with a fillet of putty $m$. The flexible strip C is applied partly over the pane and partly over the old putty.

As the fatty substance with which the strip is saturated is practically non-drying, it not only renders the strip impervious to water, but renders it permanently flexible and supple, so that it will not harden and crack when exposed to the elements. The object in soaking the strip for two days is to allow the vaseline to thoroughly penetrate the fabric, but there should be no appreciable excess of the vaseline in the fabric.

Having thus described my invention, I claim—

1. In combination with the described impervious and flexible strip, glass placed upon glazing-bars with a thin layer of putty, which stops at the edge of the glass, interposed, the space left being filled with soft putty which, like the cemented flexible strip which covers the joint, yields to the expansion and contraction of the glass and to its vibration.

2. In combination with the described impervious and flexible strip, panes of glass placed upon glazing-bars so as to overlap, with a substance interposed near the bars to form a space between the overlapping portions of the panes, said strip covering the margin of the outer overlapping pane and cemented to both panes at its respective edges.

In witness whereof I have hereunto signed my name, this 19th day of January, 1904, in the presence of two subscribing witnesses.

ETIENNE BOUTEILLE.

Witnesses:
　HANSON C. COXE,
　MARCEL ARMENGAUD, Jeune.